United States Patent
Santhanam et al.

(10) Patent No.: US 8,095,698 B2
(45) Date of Patent: Jan. 10, 2012

(54) CIRCUITS AND METHODS FOR RELIABLE AUTOMATIC USB SPEED DETECTION

(75) Inventors: Gopal Santhanam, Sunnyvale, CA (US); Kumaran Santhanam, Sunnyvale, CA (US); Etai Bruhis, Palo Alto, CA (US)

(73) Assignee: Total Phase, Inc., Sunnyvale, CA (US)

( * ) Notice: Subject to any disclaimer, the term of this patent is extended or adjusted under 35 U.S.C. 154(b) by 88 days.

(21) Appl. No.: 12/544,219

(22) Filed: Aug. 19, 2009

(65) Prior Publication Data

US 2010/0049880 A1 Feb. 25, 2010

Related U.S. Application Data

(60) Provisional application No. 61/090,223, filed on Aug. 19, 2008.

(51) Int. Cl.
*G06F 3/00* (2006.01)
(52) U.S. Cl. ........................................................ 710/15
(58) Field of Classification Search ........................ None
See application file for complete search history.

(56) References Cited

U.S. PATENT DOCUMENTS

| | | | |
|---|---|---|---|
| 7,139,344 B2 * | 11/2006 | Crutchfield et al. | 375/354 |
| 2003/0223486 A1 * | 12/2003 | Hsu | 375/224 |
| 2008/0140885 A1 * | 6/2008 | Collins | 710/67 |
| 2009/0222685 A1 * | 9/2009 | Foster et al. | 713/500 |

FOREIGN PATENT DOCUMENTS

WO WO 2007092997 A1 * 8/2007

OTHER PUBLICATIONS

Catalyst Enterprises Inc., "Conquest Series USB Protocol Analyzers," product specification, 2006, entire document relevant.
Catalyst Enterprises Inc., "Bus & Protocol Analyzers," product specification, 2005, entire document relevant.
Catalyst Enterprises Inc., "USB 1.x/2.0 Analyzer Exerciser Tester," product specification, entire document relevant.
Ellisys, "Ellisys USB Explorer 260 Getting Started Guide," manual, Nov. 22, 2007, entire document relevant.
Ellisys, "Ellisys USB Explorer 200 Getting Started Guide," manual, Feb. 13, 2006, entire document relevant.
Finisar Corporation, "Bus Doctor™ RX Analyzer," product specification, entire document relevant.
Hitex, "USB Agent Explores the secrets of USB," brochure, Jun. 2001, entire document relevant.

(Continued)

*Primary Examiner* — Eron J Sorrell
(74) *Attorney, Agent, or Firm* — Van Pelt, Yi & James LLP

(57) ABSTRACT

The Universal Serial Bus ("USB") 2.0 Specification defines three speeds of communication for its bus, and each has its own signaling characteristics. Due to the uniqueness of each speed, PHYs must be placed in a separate mode for each signaling rate. Although USB devices may know its communication speed, a general purpose USB analyzer must be able to analyze all USB communications. Rather than force the user to manually set the operating mode of the analyzer, this invention describes circuits for automatically and reliably determining the monitored USB communication speed.

28 Claims, 7 Drawing Sheets

OTHER PUBLICATIONS

LeCroy Corporation, "LeCroy Advisor™ USB 2.0 Bus and Protocol Analyzer User Manual," user manual, Jul. 2007, entire document relevant.

LeCroy Corporation, "LeCroy USBMobileHS™ Protocol Analyzer User Manual," user manual, Jul. 2007, entire document relevant.

LeCroy Corporation, "LeCroy USBTracer™ USB 2.0 Design & Verification System User Manual," user manual, Jul. 2007, entire document relevant.

Author Unknown, "Universal Serial Bus Specification," specification, Apr. 27, 2000, entire document relevant.

* cited by examiner

| Signal | D+ | D- |
|---|---|---|
| Low-speed (1.5 Mbps, 3.3V) | | |
| J | 0 | 1 |
| K | 1 | 0 |
| SE0 | 0 | 0 |
| SE1 | 1 | 1 |
| Full-speed (12 Mbps, 3.3V) | | |
| J | 1 | 0 |
| K | 0 | 1 |
| SE0 | 0 | 0 |
| SE1 | 1 | 1 |
| High-speed (480 Mbps, 400 mV) | | |
| J | 1 | 0 |
| K | 0 | 1 |
| SE0 | 0 | 0 |
| SE1 | 1 | 1 |

Fig. 1b

CIRCUITS AND METHODS FOR RELIABLE AUTOMATIC USB SPEED DETECTION

CROSS REFERENCE

This application claims priority from a provisional patent application entitled "Methods for Reliable Automatic USB Speed Detection Using Multiple Physical Interfaces" filed on Aug. 19, 2008 and having an Application No. 61/090,223. Said application is incorporated herein by reference.

FIELD OF INVENTION

This invention relates to circuits and methods for analyzing of USB traffic and, in particular, to circuits and methods for determining USB signaling speed in analyzing USB traffic.

BACKGROUND

The USB 2.0 Specification defines three speeds of communication: low-speed (1.5 Mbps), full-speed (12 Mbps), and high-speed (480 Mbps). Aside from the speed differences, each of these signaling rates also has unique signaling characteristics. Thus, a USB analyzer, which sits passively on the bus and monitors bus traffic, must be able to handle each of these operating modes appropriately. FIG. 1a illustrates a common setup for the USB analyzer where a target host 10 transmits information to the target device 12 and a protocol analyzer 14 analyzes the traffic between the target host 10 and the target device 12. An analysis computer 16 can be setup to interact with the protocol analyzer 14 in the examination of such traffic.

The USB protocol specifies a set of differential signals to transmit data across a bus which are called D+ and D−. These two lines can potentially have four different line-states, however only three states are valid in the USB specification. These three valid line-states are called J, K, and SE0, and they are illustrated in FIG. 1b for the three USB speeds: full-speed (FS), low-speed (LS), and high-speed (HS). It is important to note that the J line-state also designates the idle state of the bus for the FS and LS buses, and SE0 is the idle line-state for high-speed. It is also important to note that LS and FS signaling have opposite polarities for their J and K line-states, and HS signaling runs at a much lower signaling level (400 mV compared to 3.3V). Thus, each signaling rate can be uniquely described by its idle line-state.

The problem is that most HS capable PHYs can only effectively monitor a single speed during any one time period, and must therefore be configured to that speed (LS mode, FS mode, or HS mode). Furthermore, auto speed detection of other products and technologies is known to be unreliable. Robust USB analyzers must be able to monitor all USB speeds, and must therefore be capable of determining the speed of the bus and configuring the PHY appropriately. The quick detection of these bus speeds is especially necessary in situations where the bus may be changing back and forth between speeds. An example of this would be during the high-speed negotiation process, in which the analyzer must quickly switch to a HS mode from a FS mode in order to capture the negotiation. Thus it would be desirable to have reliable methods for correctly determining the speed of the USB bus.

SUMMARY

Briefly, in a preferred embodiment of the present invention, circuits for detecting USB signaling mode in analyzing USB traffic are disclosed, comprising of a first receiver for receiving USB traffic; and a second receiver for receiving USB traffic; wherein the first receiver and the second receiver are placed in parallel in receiving the USB traffic; and wherein the first receiver may be a high-speed capable receiver and the second receiver may be a full-speed receiver. The signaling mode may be detected by the first receiver and the second receiver by the steps of: entering a capture mode from an initial mode upon detecting a corresponding SYNC sequence; entering a high-speed capture mode upon detecting a SE0 signal for a first duration; entering a low-speed capture mode from the high-speed capture mode upon detecting a FS-K signal; entering a full-speed capture mode from the high-speed capture mode upon detecting a FS-J signal; entering a low-speed-over-full-speed mode from the full-speed capture mode upon detecting a FS-K signal for a second duration; entering a full-speed capture mode from the low-speed-over-full-speed capture mode upon detecting a FS-J signal for a third duration; and entering a full-speed capture mode from the low-speed-over-full-speed capture mode upon packet completion.

DESCRIPTION OF THE DRAWINGS

The foregoing and other objects, aspects, and advantages of the invention will be better understood from the following detailed description of the preferred embodiment of the invention when taken in conjunction with the accompanying drawings in which:

FIG. 1b illustrates the line-states and signaling levels of the three USB 2.0 signaling rates.

DETAILED DESCRIPTION OF THE PREFERRED EMBODIMENTS

The preferred embodiments provide methods for highly reliable automatic speed detection of USB signaling rates by using both a full-speed receiver and a high-speed capable PHY as inputs to an intelligent digital logic system. The high-speed capable PHY can be an ULPI or UTMI receiver; however this device can be any high-speed capable receiver with associated control logic to provide packet level information. On the other hand, the FS receiver can simply be a device that provides raw data-line information on a FS threshold level. To differentiate the two devices, the ULPI/UTMI devices will be referenced as the PHY, while the other device will be called the FS receiver.

It should be noted that the present invention does not require the use of the PHY to accomplish its goals. It is only in the preferred embodiment that the PHY is used. In typical scenarios it is a PHY that needs to be configured to the appropriate mode, so the readily available signals (such as the indication of an active packet) are taken advantage of. However, if speed detection is used for any purpose that does not require a PHY then only the FS receiver is necessary, and the indication of an active packet could be done through internal logic.

A couple key features of the USB specification are used to accomplish reliable speed detection. The first is that all HS signaling levels fall in a threshold that is below that of any FS receiver. This means that all HS traffic appears as an SE0 signal on FS receivers. The second is that after every SE0 signal, the data lines return to their idle state—which is unique to each speed. In the case of FS buses the D+ line is high and the D− line is low for its idle state. For LS buses, the D− line is high and the D+ line is low.

Figure 1A:
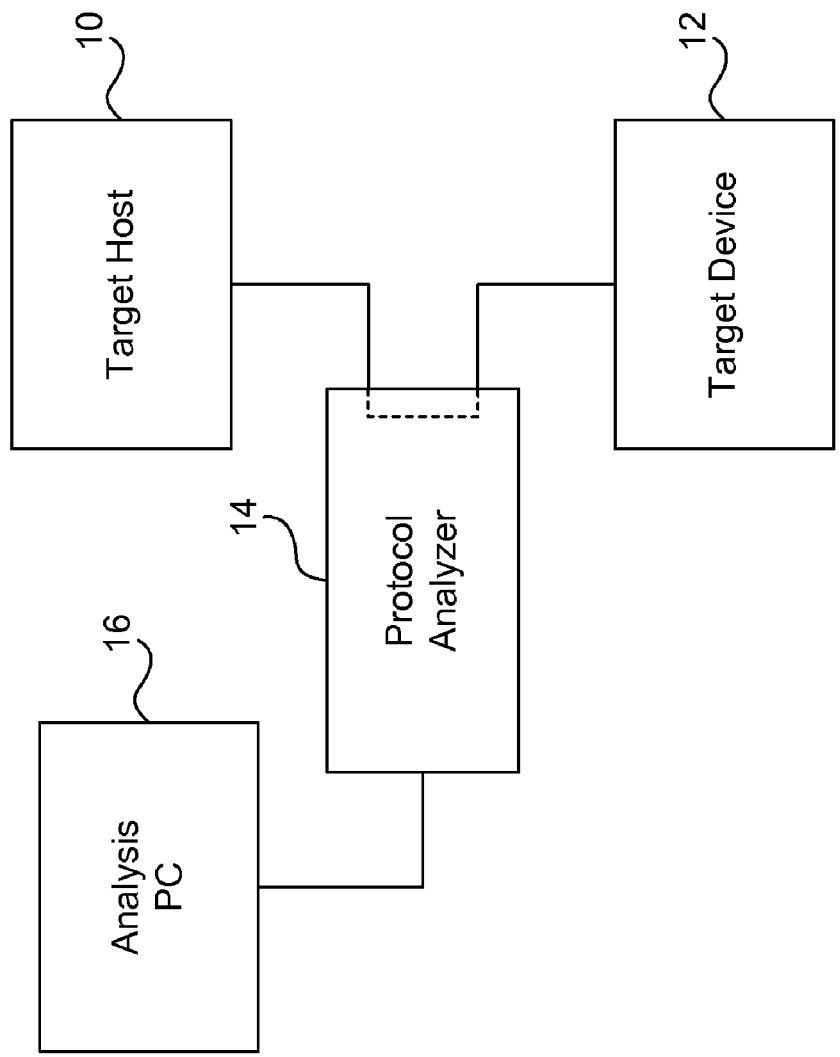
FIG. 1a illustrates a common protocol analyzer setup, where the USB traffic passes through the protocol analyzer and is captured and passed to the analysis computer.
Figure 2:
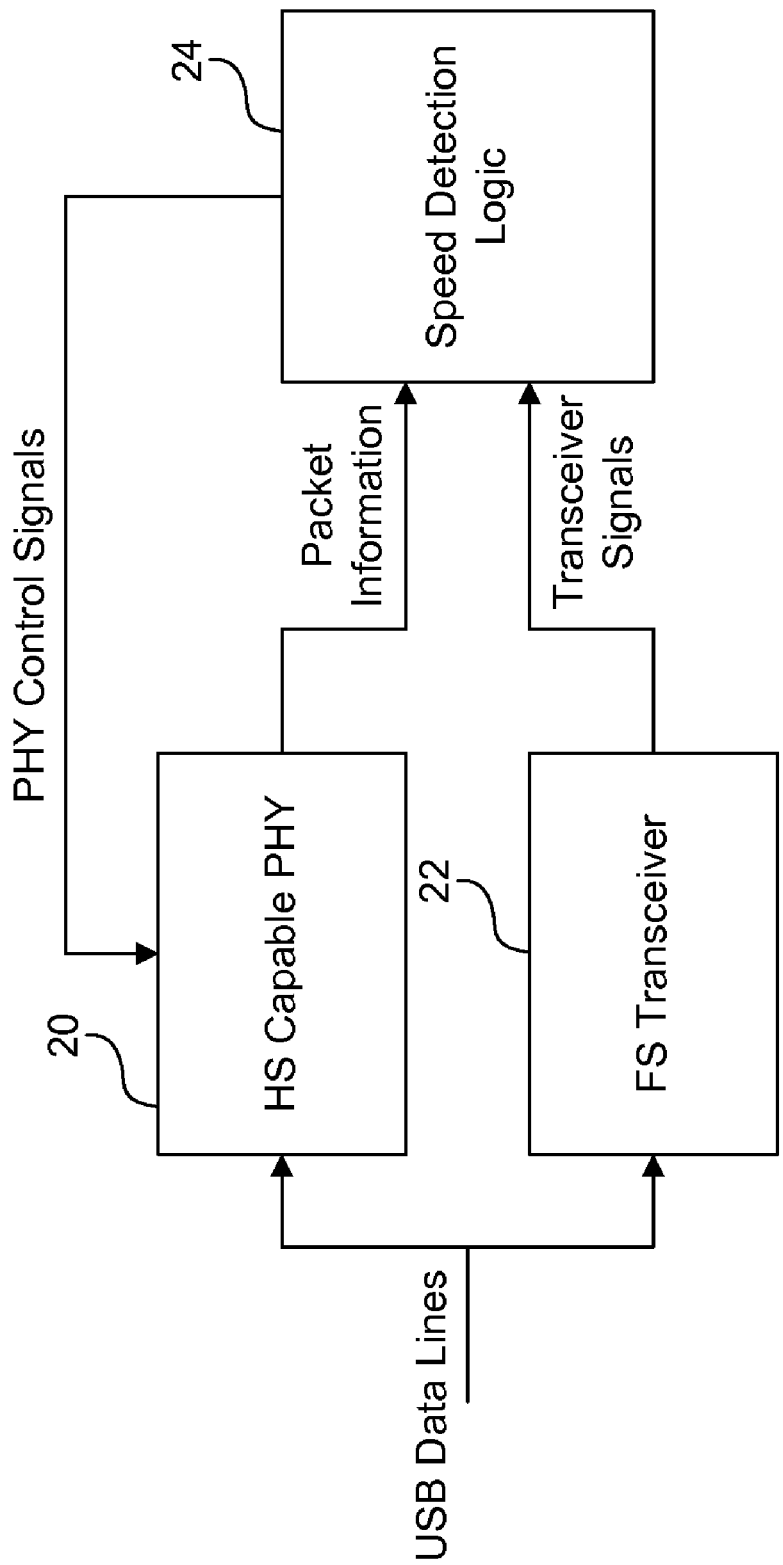
FIG. 2 illustrates a block diagram for automatic speed detection.

FIG. 2 illustrates one embodiment of the signal paths for the automatic speed detection in the preferred embodiment of the present invention. Both the high speed capable PHY 20 and the FS receiver 22 are on the same USB data lines, but they provide different information to the speed detection logic. The PHY 20 provides packet information such as whether or not an active packet is on the bus. On the other hand, the FS receiver 22 provides information on the current state of the USB data lines using a 3.3V signal level threshold. The speed detection logic 24 uses this information to configure the PHY to the appropriate bus speed using the PHY control signals.

The preferred embodiment starts in an initial state upon start-up. In this initial state all information from the PHY is ignored, and can thus be turned off or preset to any reception mode. The preferred embodiment presets the PHY into the high-speed mode.

Figure 3:
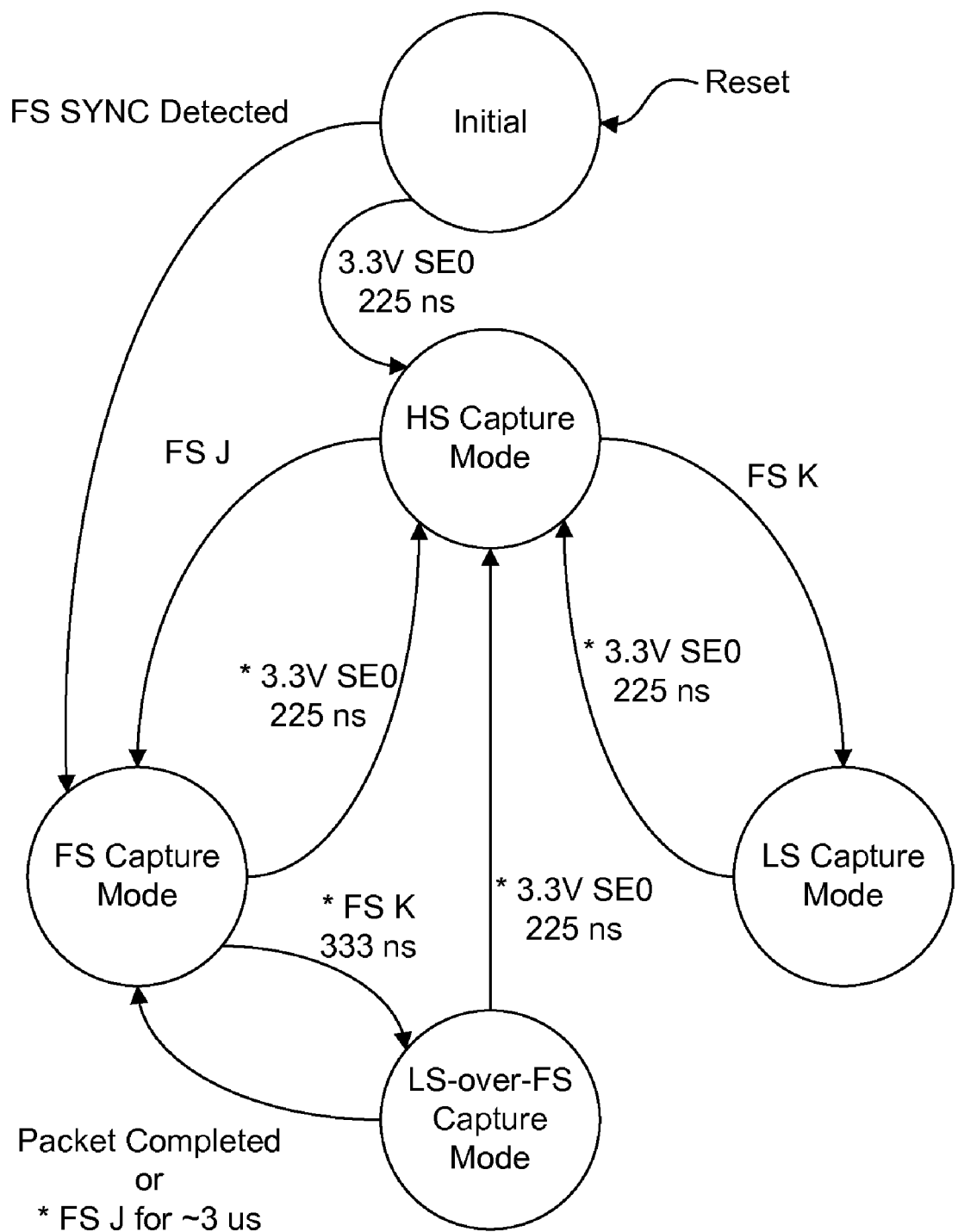
FIG. 3 illustrates a state diagram and the transition conditions among the states.

FIG. 3 illustrates a state diagram for the speed detection logic and the transition conditions among the states. Note that the transition conditions prefaced with a "*" are outside of the context of an active packet; all 3.3V level signals (FS J, K, SE0) come from the FS receiver; and the FS SYNC Detected signal comes from the FS SYNC detection module depicted in FIG. 5. The preferred embodiment accomplishes its speed detection by transitioning into HS mode whenever the FS receiver sees an SE0 signal on the bus outside of the context of a valid USB packet. This allows for maximum flexibility as it allows the analyzer to check if this is a truly an SE0 signal, or actually HS traffic. If, while in HS mode, either of the USB data-lines goes to a 3.3V signaling level, then the speed detection unit transitions out of the HS mode. If it was the D+ line that went high, the analyzer is put into FS mode. If it was the D− line that went high, the analyzer is put into LS mode. This decision can be made due to the unique idle line-states of the LS and FS buses after an SE0 signal.

Figure 4:
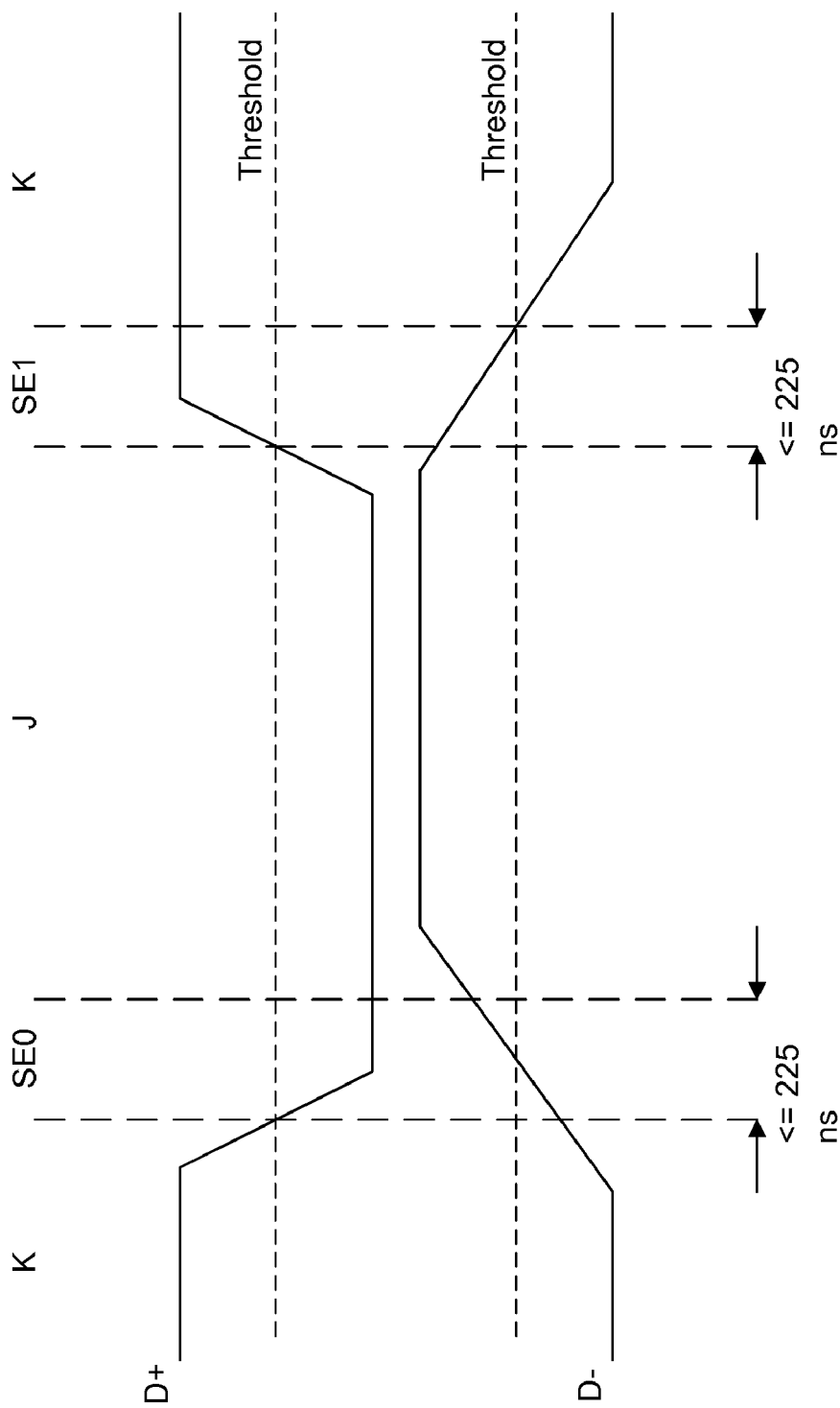
FIG. 4 illustrates sample LS signals, where differences in rise times can cause single-ended (SE0 or SE1) line-states for 225 ns at the worst case.

It should be noted that the preferred embodiment requires that the SE0 signal appear for a specific duration in order for a transition to occur. The USB specification for LS devices defines that the rise and fall times of the data lines must be between 75 ns and 300 ns. This means that in the worst case, the LS bus can have an SE0 line-state for as much as 225 ns between bits of a LS transmission (see FIG. 4). It would be unwise to switch the PHY to a high-speed mode during LS signaling. Thus, the SE0 signal must appear on the line for more than 225 ns in order to change to the HS mode.

This method works quite well during a capture, but it has some issues at the very start of a capture. Due to the unique requirements of a protocol analyzer, a capture may be started on an already active bus. Furthermore, the capture may be started in the middle of a transmission of a packet. Protocol analyzers must therefore be robust to these situations and handle them gracefully—providing users with inaccurate information defeats the purpose of the tool. One method for handling these situations is to simply wait until the end of the first packet. This ensures that the next packet the analyzer sees is a complete packet. While this will drop the first packet of an already communicating bus, it is acceptable for an analyzer to do this as it simply appears to the user as a marginally delayed start of a capture.

FOR FS and LS devices, an end-of-packet (EOP) signal is an SE0 line-state for two bit-times at the respective signaling rate. As a result, the transition out of the initial state is treated much like the rest of the logic; wait for an SE0 signal and transition into the HS state. However, the transition can only occur if the SE0 is of a duration of at least 225 ns, due to issues previously described and also illustrated in FIG. 4. Given this approach, it must be ensured that the logic can transition out of the initial state in the presence of the various bus conditions:

1. A LS EOP is approximately 1300 ns—well above the 225 ns cut-off. Therefore it is guaranteed that an already communicating LS bus will transmit an SE0 signal of the required duration, and allow the speed detection unit to transition out of the initial state (see FIG. 3);
2. HS transmissions always appear as an SE0 to a 3.3V receiver, and will therefore also guarantee a transition out of the initial state in FIG. 3;
3. If no devices are plugged in, the lines will default to an SE0 signal and cause a transition out of the initial state; and
4. FS buses have an EOP of two bit-times, but their signaling rate causes this EOP to have a duration of approximately 167 ns. Therefore, additional logic must be employed to transition out of the initial state for an already communicating FS bus. This is described as follows. In order to handle the situation where the capture is started during an already communicating FS bus, the speed detection logic will also transition out of the initial state to the FS state upon detecting a FS SYNC pattern (see FIG. 5). The SYNC pattern is a special sequence that starts every package and is unique to each signaling rate. Thus, by searching for this pattern, it can be confirmed whether the bus is operating at FS or not.

Figure 5:
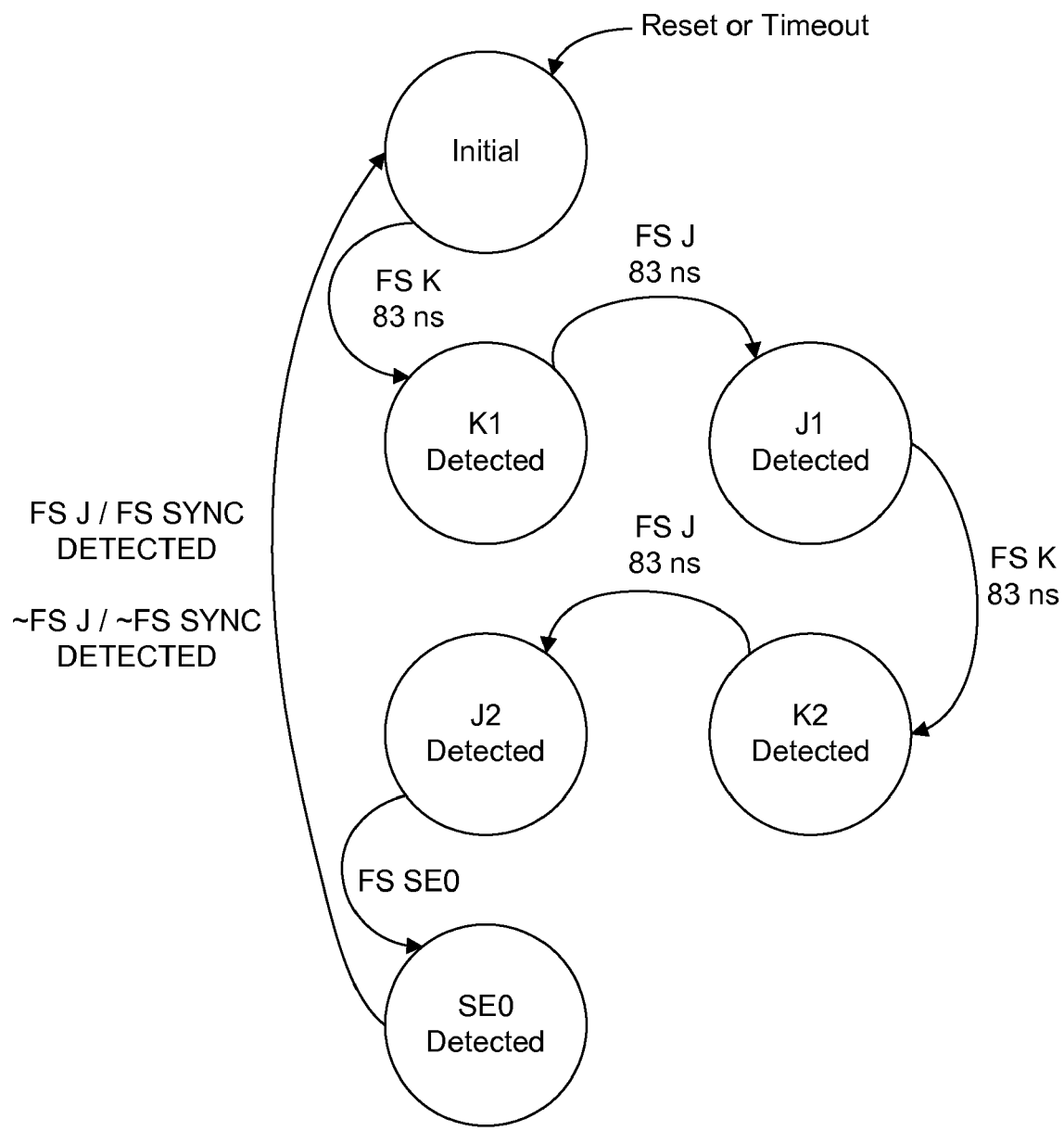
FIG. 5 illustrates the state diagram and transition conditions for FS SYNC detection.

Referring to FIG. 5, the FS SYNC detector works by searching for a specific pattern (KJKJ). Each of these bits must have a duration that is within the specification for a FS bit-time. Detecting this sequence allows for a unique differentiation of FS signaling, however the PHY must only be transitioned into a FS mode after the packet is complete. This is done so that the PHY only starts receiving full packets. Thus, after detecting the SYNC pattern, the logic waits until the packet completes (an SE0 signal is seen) before alerting the speed detection logic. After seeing the SE0 signal, the logic does an extra check to make sure that a FS J is detected immediately after the SE0 signal. If so, the speed detection unit is alerted that a FS SYNC was detected, and will transition out of the initial state to the FS capable mode. If a FS J signal is not detected, the detection logic returns to the initial state without asserting the FS detected signal.

The use of the FS SYNC as a transition into the FS mode is not used outside of the initial state because it causes the analyzer to drop the packet whose SYNC was detected. This is due to the fact that the PHY is only changed into the appropriate mode after the packet has completed. As described earlier, it is acceptable of the analyzer to drop the very first packet on an already communicating bus, as it simply appears as a slightly delayed start of a capture. Dropping packets at any other time would defeat the purpose of the tool, as the user would be unable to differentiate from captures in which the analyzer dropped the packet or in which the devices under test never transmitted the packet.

Figure 6:
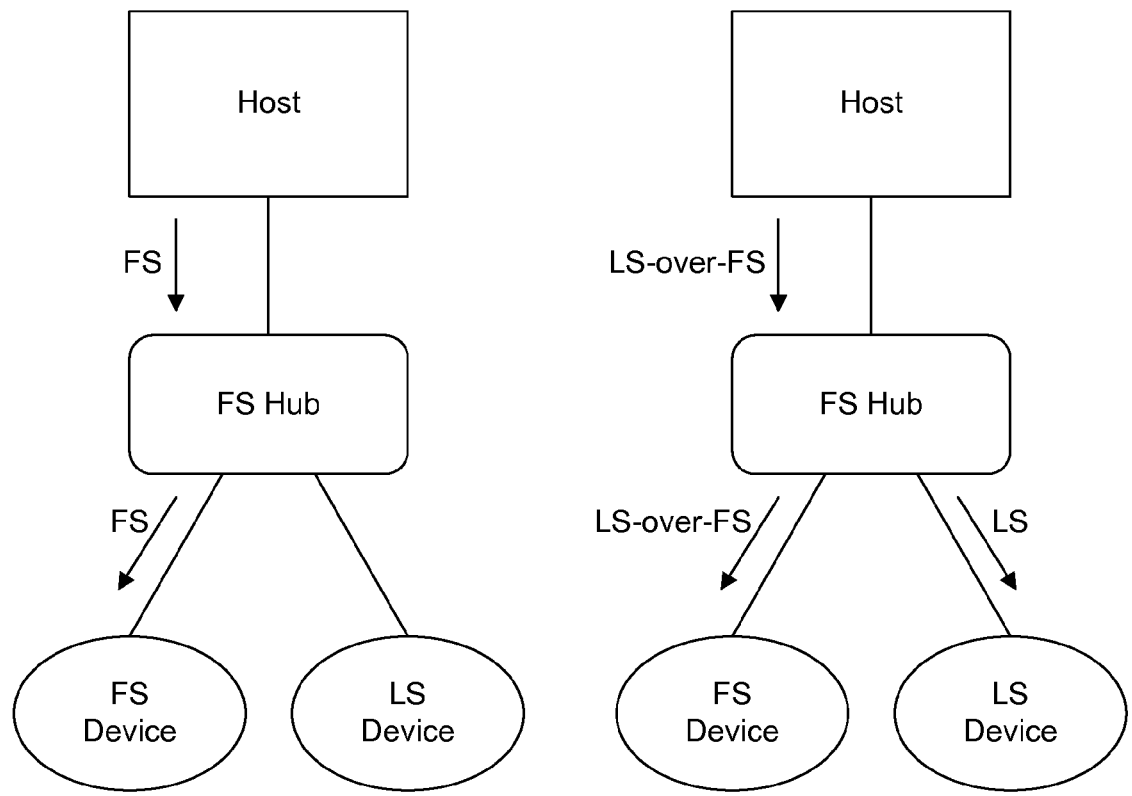
FIG. 6 illustrates examples of FS and LS-over-FS traffic patterns.

LS-over-FS signaling is a unique USB signaling mode in which FS polarity signals are sent at LS signaling rates. This mode will be encountered whenever a LS device is connected to a FS bus (i.e., through a FS hub). The hub is responsible for keeping out FS signals to the LS device, and inverting the polarity of the LS-over-FS signals so that they look correct to LS devices. On the other hand, FS devices connected in such a configuration will see both FS signals and LS-over-FS signals (see FIG. 6). Thus, a robust protocol analyzer that wishes to show all communication that occurs on the bus must be able to show both the FS and LS-over-FS signals that may be present, and change the setting of the PHY appropriately if necessary.

The present invention will transition to the LS-over-FS mode from the FS mode when a FS K signal is seen on the bus for approximately 333 ns outside the context of an active packet. The timing of this FS K signal is such that it would be impossible for it to occur outside of the context of an active packet, except during the beginning of a LS-over-FS SYNC sequence or a FS resume signal. Therefore, if specific safety measures are put in place, it uniquely describes the LS-over-FS signaling mode, and can be used to cause a transition and change in the PHY. The transition out of the LS-over-FS mode is done in a number of ways. The most obvious is the transition back to FS mode once a packet completes. Some safety measures are also put in place in case a packet never appears (such as during a resume signal). Specifically, if a FS J signal is seen on the bus for more than 3 us outside the context of an active packet, then the PHY is reverted back to FS. This duration is chosen so that it can not happen before the PHY has an opportunity to assert the validity of a packet, but is still fast enough to be able to transition and capture the next packet. Furthermore, as in all the previous states, if an SE0 signal is seen on the bus for at least 225 ns outside of the context of an active packet, then the PHY is reverted back to HS.

Further note that the multiple receivers may be on a single chip, or be separated on multiple chips, but must be operated simultaneously. Also, initially the analyzer may transition out of the initial state directly into the LS mode by looking for a LS SYNC sequence. In an alternative embodiment, the initial state of the PHY can be preset into the FS mode, and the speed detection logic can then use the PHY's internal logic to detect the FS SYNC (instead of doing it manually through the FS receiver signals). In a further alternative embodiment, the generation of the active packet signal for FS, LS, and LS-over-FS signaling can be done manually by processing the raw signals of the receiver, and tracking the SYNC and EOP signals.

We claim:

1. A circuit for detecting USB signaling mode in analyzing USB traffic, comprising:
a first receiver configured to receive a stream of USB traffic and provide an indication of an active packet;
a second receiver configured to receive the stream of USB traffic in parallel with the first receiver and provide state information of the stream of USB traffic; and
a speed detection logic configured to detect a USB signalizing mode at least in part based on the indication from the first receiver and the state information from the second receiver.

2. The circuit of claim 1 wherein the first receiver is a high-speed capable receiver.

3. The circuit of claim 1 wherein the second receiver is a full-speed receiver.

4. The circuit of claim 2 wherein the second receiver is a full-speed receiver.

5. The circuit for detecting USB signalizing mode in analyzing USB traffic, comprising:
a first receiver for receiving a stream of USB traffic; and
a second receiver for receiving the stream of USB traffic;
wherein the first receiver and the second receiver are placed in parallel to the stream of USB traffic; and
wherein the USB signaling mode is detected by the first receiver and the second receiver by:
entering a capture mode from an initial mode upon detecting a corresponding SYNC sequence;
entering a high-speed capture mode upon detecting a SE0 signal for a first duration;
entering a low-speed capture mode from the high-speed capture mode upon detecting a FS-K signal;
entering a full-speed capture mode from the high-speed capture mode upon detecting a FS-J signal;
entering a low-speed-over-full-speed mode from the full-speed capture mode upon detecting a FS-K signal for a second duration;
entering a full-speed capture mode from the low-speed-over-full-speed capture mode upon detecting a FS-J signal for a third duration; and
entering a full-speed capture mode from the low-speed-over-full-speed capture mode upon packet completion.

6. The circuit of claim 5 wherein the detection of the SE0 signal, the FS-K signal, the FS-J signal is performed by the second receiver.

7. The circuit of claim 5 wherein the first receiver provides an indication of an active packet.

8. The circuit of claim 5 wherein the second receiver is used to detect SYNC and EOP as an indication of an active packet.

9. The circuit of claim 5 wherein the first duration is a minimum of 225 ns.

10. The circuit of claim 5 wherein the second duration is a minimum of 333 ns.

11. The circuit of claim 5 wherein in the entering a high-speed capture mode step, the detection of the SE0 signal is not performed during the receiving of a valid packet.

12. The circuit of claim 5 wherein in the entering a full-speed capture mode from the low-speed-over-full-speed capture mode step, the detection of the FS-J signal is not performed during the receiving of a valid packet.

13. The circuit of claim 5 wherein in the entering a low-speed-over-full-speed capture mode step, the detection of the FS-K signal is not performed during the receiving of a valid packet.

14. The circuit of claim 5 wherein in the entering a capture mode from an initial mode step, the capture mode is the full-speed mode.

15. The circuit of claim 5 wherein in the entering a capture mode from an initial mode step, the capture mode is the low-speed mode.

16. A circuit for detecting USB signalizing mode in analyzing USB traffic, comprising:
a first receiver for receiving a stream of USB traffic, wherein the first receiver is a high-speed capable receiver; and
a second receiver for receiving the stream of USB traffic, wherein the second receiver is a full-speed receiver;
wherein the first receiver and the second receiver are placed in parallel to the stream of USB traffic; and
wherein the USB signaling mode is detected by the first receiver and the second receiver by:
entering a capture mode from an initial mode upon detecting a corresponding SYNC sequence;

entering a high-speed capture mode upon detecting a SE0 signal for a first duration by the second receiver;

entering a low-speed capture mode from the high-speed capture mode upon detecting a FS-K signal by the second receiver;

entering a full-speed capture mode from the high-speed capture mode upon detecting a FS-J signal by the second receiver;

entering a low-speed-over-full-speed mode from the full-speed capture mode upon detecting a FS-K signal for a second duration;

entering a full-speed capture mode from the low-speed-over-full-speed capture mode upon detecting a FS-J signal for a third duration; and entering a full-speed capture mode from the low-speed-over-full-speed capture mode upon packet completion.

17. The circuit of claim 16 wherein the first receiver provides an indication of an active packet.

18. The circuit of claim 16 wherein the second receiver is used to detect SYNC and EOP as an indication of an active packet.

19. The circuit of claim 16 wherein in the entering a capture mode from an initial mode step, the capture mode is the full-speed mode.

20. The circuit of claim 16 wherein in the entering a capture mode from an initial mode step, the capture mode is the low-speed mode.

21. The circuit of claim 5, wherein the first receiver comprises a high-speed capable receiver.

22. The circuit of claim 5, wherein the second receiver comprises a full-speed receiver.

23. The circuit of claim 1, wherein the second receiver is configured to provide state information of the stream of USB traffic based at least in part on a predetermined signal level threshold.

24. The circuit of claim 23, wherein the predetermined signal level threshold is 3.3 V.

25. The circuit of claim 1, wherein the state information comprises information for detecting FS-K signals and FS-J signals.

26. The circuit of claim 1, wherein the speed detection logic is further configured to configure the first receiver based on the detected USB signalizing mode.

27. The circuit of claim 1, wherein the USB signaling mode is detected by the first receiver and the second receiver by:
   entering a high-speed capture mode upon detecting a SE0 signal for a first duration;
   entering a low-speed capture mode from the high-speed capture mode upon detecting a FS-K signal; and
   entering a full-speed capture mode from the high-speed capture mode upon detecting a FS-J signal.

28. The circuit of claim 1 wherein the USB signaling mode is detected by the first receiver and the second receiver by:
   entering a capture mode from an initial mode upon detecting a corresponding SYNC sequence;
   entering a high-speed capture mode upon detecting a SE0 signal for a first duration;
   entering a low-speed capture mode from the high-speed capture mode upon detecting a FS-K signal;
   entering a full-speed capture mode from the high-speed capture mode upon detecting a FS-J signal;
   entering a low-speed-over-full-speed mode from the full-speed capture mode upon detecting a FS-K signal for a second duration;
   entering a full-speed capture mode from the low-speed-over-full-speed capture mode upon detecting a FS-J signal for a third duration; and
   entering a full-speed capture mode from the low-speed-over-full-speed capture mode upon packet completion.

* * * * *